United States Patent
Bateman

[15] 3,654,806
[45] Apr. 11, 1972

[54] AIRCRAFT INSTRUMENT
[72] Inventor: Charles Donald Bateman, Bellevue, Wash.
[73] Assignee: Sundstrand Data Controls, Inc.
[22] Filed: June 18, 1970
[21] Appl. No.: 47,517

[52] U.S. Cl. ........................................................73/178 R
[51] Int. Cl. ......................................................G01c 21/00
[58] Field of Search ................73/180, 178 R, 178 T; 33/46.5

[56] References Cited

UNITED STATES PATENTS

| | | | |
|---|---|---|---|
| 3,128,623 | 4/1964 | Gold | 73/178 |
| 2,887,927 | 5/1959 | Newton | 33/46.5 X |
| 3,280,625 | 10/1966 | Birmingham | 73/178 |

Primary Examiner—Donald O. Woodiel
Attorney—Hofgren, Wegner, Allen, Stellman & McCord

[57] ABSTRACT

An aircraft instrument utilizing a signal which represents the aircraft angle of attack, in a head-up display, to direct the pilot during the approach to a landing. The signal drives a bar in the display to indicate the touchdown point, with reference to the outside world. The angle of attack signal is pitch stabilized to improve its flyability. A signal representing a change in aircraft pitch attitude is combined with a signal representing a change in aircraft attitude caused by the pilot to distinguish wind gusts from pilot commands and the resulting signal combined with the angle of attack signal to compensate the movement of the bar for the effect of gusts on the aircraft.

9 Claims, 5 Drawing Figures

AIRCRAFT INSTRUMENT

This invention relates to an aircraft instrument having a head-up display of flight path relative to external objects which may, for example, be used to direct a pilot during the approach to a landing. In accordance with the invention, the instrument is pitch compensated to stabilize the display with respect to the outside world when the aircraft is flying through turbulent air.

A typical head-up display has a reflective panel or screen positioned in the pilot's line of vision. The screen is sufficiently transparent to provide the pilot with an unobstructed view of outside objects, yet sufficiently reflective to display information that is visible to the pilot when his eye is focused at a distance from the aircraft. In one such instrument, a bar is projected on the screen and positioned by the angle of attack of the aircraft to indicate the projected flight path to the pilot. A pitch scale is also displayed. The pilot can align the bar with a desired angle, as −3°, on the pitch scale, superimpose the bar on a point on the ground and fly the bar to touch-down. An application of Robert K. Kirschner, Ser. No. 48,148, filed June 22, 1970, and assigned to the assignee of this invention, discloses and claims novel features of a collimated head-up display apparatus illustrated in this application.

The basic angle of attack signal may be complemented with other signals. For example, Bateman et al. application, Ser. No. 42,918, filed June 3, 1970, discloses a system which reduces the effect of long term wind errors on the flight path.

A head-up flight path display should be lag-free and, in fact, should actually lead the motion of the aircraft to avoid control action by the pilot which might cause oscillation. However, in order that the display be free of short term disturbances, a lag is introduced which, in effect, keeps the display bar anchored to the airframe.

In turbulent air, aircraft are subject to pitch disturbances which are particularly pronounced in short coupled aircraft where the tail is close to the wing. A pilot will normally not attempt to correct for such disturbances, knowing that the flight path will average out over a period of time. However, a head-up display of flight path with relation to fixed ground features is at best difficult to follow in turbulence and may be completely unflyable.

The present invention eliminates this problem by modifying the signal to be displayed with a signal representing the change of aircraft pitch attitude.

Another feature of the invention is that provision is made in developing the pitch attitude change signal to distinguish between a change due to a wind gust and a change attributed to a pilot commanded maneuver. The displayed signal is corrected only for the change attributed to the wind gust. More particularly, a pilot commanded maneuver is identified either from a change of aircraft elevator position or the relation of vertical acceleration to pitch change.

Further features and advantages of the invention will readily be apparent from the following specification and from the drawings, in which.

The visual flight path aid is illustrated and described herein as used during the approach to a landing. It is anticipated that one of its major uses will be in this particular flight procedure. The instrument may also be used to provide the pilot with flight path information during a climb or a descent. More particularly, the instrument can be utilized to provide the pilot with information concerning the relation between the flight path of the aircraft and an obstacle, as a mountain, for example.

Figure 2:
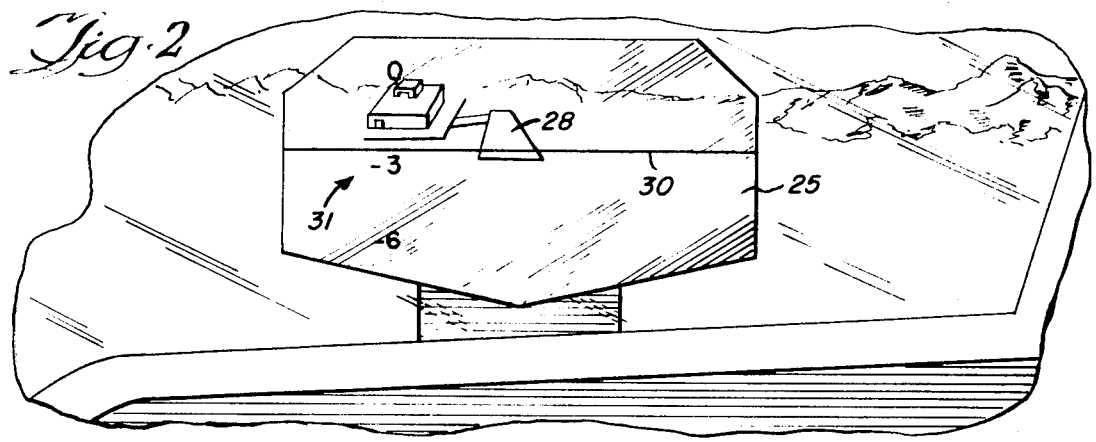
FIG. 2 is a fragmentary view illustrating the relationship of the display indicia and the ground as seen by the pilot during a landing approach.

In the cockpit of aircraft 20, a head-up display instrument 21 is mounted inside windshield 22 and in the normal line of sight of pilot 23. The head-up display includes an image combiner screen 25 on which indicia are projected from source 26. The combiner screen is partially reflective so that the projected indicia and the outside world are both visible to the pilot with the indicia superimposed on ground features as illustrated in FIG. 2. The screen and indicia source are so configured and related that the reflected light is collimated, as indicated by parallel light rays 27, and the relation of the indicia to ground features is not dependent on the position of the pilot's head. The combiner screen 25 is of sufficient size to permit binocular vision of the display and a runway 28, during descent.

Figure 1:
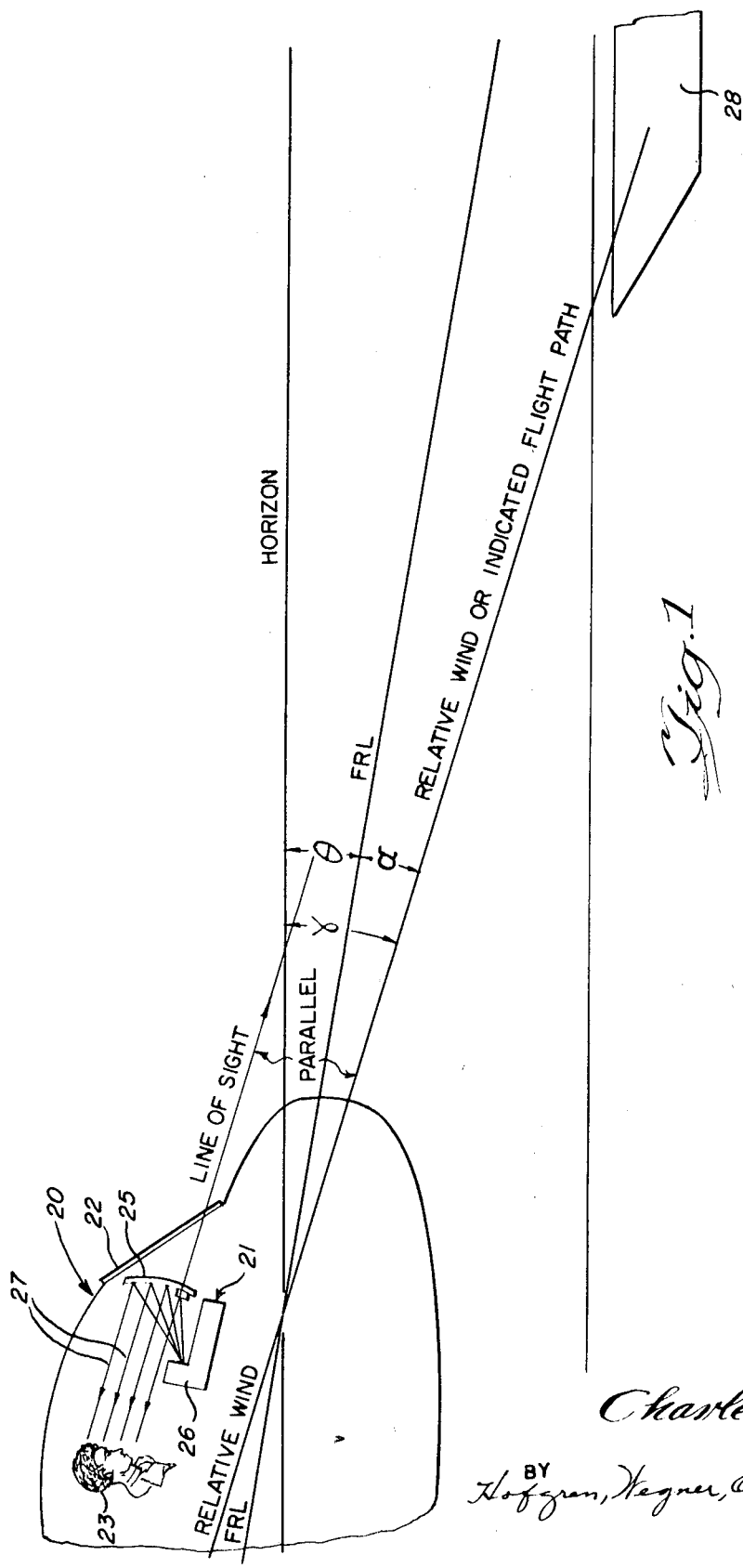
FIG. 1 is a diagrammatic illustration of a portion of an aircraft, the visual landing aid display, the pilot and the end of the runway during a typical landing approach.

There is displayed on the combiner 25 a transverse line 30 and vertically oriented scale indicia 31. The transverse bar 30, shown in an exaggerated form in FIG. 1, is positioned vertically on the display with reference to the aircraft fuselage in accordance with a signal representing an aircraft flight path condition. The angle of attack of the aircraft may be used as described in Bateman et al., Ser. No. 42,918, filed June 3, 1970. The bar will thus be positioned at an angle with respect to the earth's horizon representing the aircraft's flight path. The vertical scale 30 is positioned by a signal from a vertical gyroscope. When the aircraft is at a relatively low altitude, as during an approach for landing, the 0 degree indication of the vertical scale is locked with the horizon. The scale indicia indicate the flight path angle to be followed by the aircraft to reach the point on the ground over which the indicia appears. The transverse line or bar 30 indicates the point the aircraft will reach if it continues with the same configuration and power setting.

Some of the angular relationships involved are illustrated diagrammatically in FIG. 1. The airplane 20 has a pitch angle, $\theta$, which is below the horizontal and has a negative sign. This is the angle between the horizon and an extension of the fuselage reference line, FRL. The angle of attack, $\alpha$, is the direction of the relative wind with respect to the aircraft body. The pilot, looking past the bar 30, positioned in accordance with the angle of attack, sees an indicated flight path $\gamma$, where $\gamma = \theta + \alpha$.

In utilizing the visual landing aid in a typical situation, a pilot might approach runway 28 flying at a fixed altitude of 2,000 feet. As he approaches the end of the runway, the angle between the aircraft and the runway will increase (in the negative direction), as indicated by vertical indicia 31 of the display. In this flight condition the bar 30 is superimposed on the horizon. When the end of the runway is aligned with the scale marking for the glide slope to be followed, as −3°, for example, the pilot pitches the airplane over, reduces power on the engines, and aligns the bar 30 with the end of the runway. The plane is then flown toward the runway keeping the bar 30 aligned with the end of the runway, or the desired touch-down point, by coordinated manipulation of the elevators and/or throttles.

Figure 3:
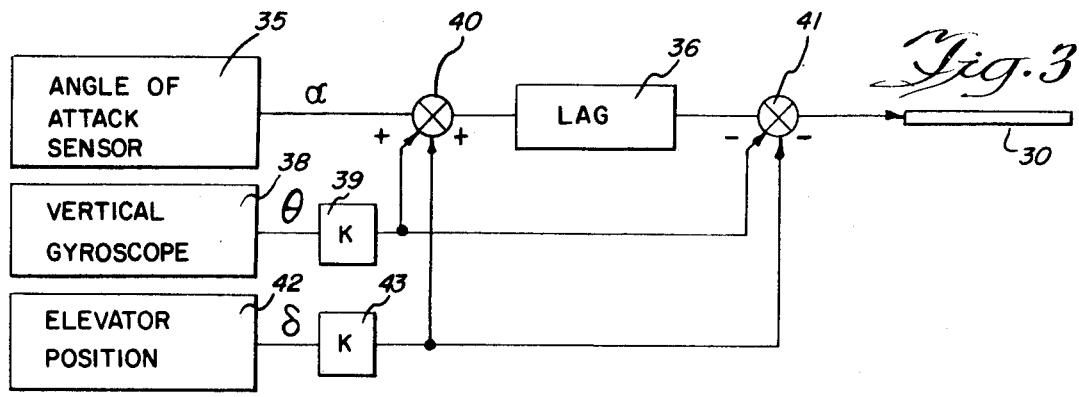
FIG. 3 is a functional block diagram of a preferred embodiment of the aircraft instrument of the invention.

The generation of a pitch stabilized flight path condition signal in accordance with the invention is illustrated in FIG. 3. A signal representing the aircraft angle of attack, $\alpha$, is derived from an angle of attack sensor 35. This signal is connected through a lag filter 36 and utilized to position the transverse bar 30 of the head-up display. The lag filter 36 removes high frequency noise from the angle of attack signal, but has a time constant which is short with respect to the response time of the aircraft so that the bar 30 provides the pilot with lead information, as discussed above.

A pitch signal, $\theta$, from vertical gyroscope 38 provides the basic information for pitch stabilization of the display. In the circuit of FIG. 3, the pitch signal is connected through a scaling amplifier 39 (which establishes the proper signal amplitude with relation to other signals in the system) with a summing junction 40 where it is added to the angle of attack signal, ahead of lag network 36. The pitch signal is also connected with summing junction 41 where it is combined with the output of lag circuit 36 in a sense opposite that at summing junction 40. The effect of the lag network 36 on the pitch signal is to remove from it the short term pitch variations. Thus, the output of the lag network includes the angle of attack signal to be displayed and a long term or steady state pitch signal. The total pitch signal is added at junction 41 so that the resulting signal applied to display bar 30 includes the lagged angle of attack signal and a signal component representing the short term or pitch change signal. When the aircraft is subjected to rapid pitch disturbances, the pitch stabilization signal will cause the display bar 30 to move with reference to the aircraft fuselage while remaining relatively fixed with respect to the pilot's view of features on the ground.

Pitch changes may occur either as a result of air mass disturbances or a pilot commanded maneuver. It is preferable that the display be compensated only for the air mass disturbances so that the pilot will be able to see the result of his maneuvers on the flight path. In the system of FIG. 3, a signal representing the elevator position, $\delta$, is derived from an elevator position transducer 42. This signal is connected through scaling circuit 43 and combined with the pitch signal at summing junctions 40 and 41 to cancel out the pitch changes which result from pilot controlled manipulation of the elevator.

Figure 4:
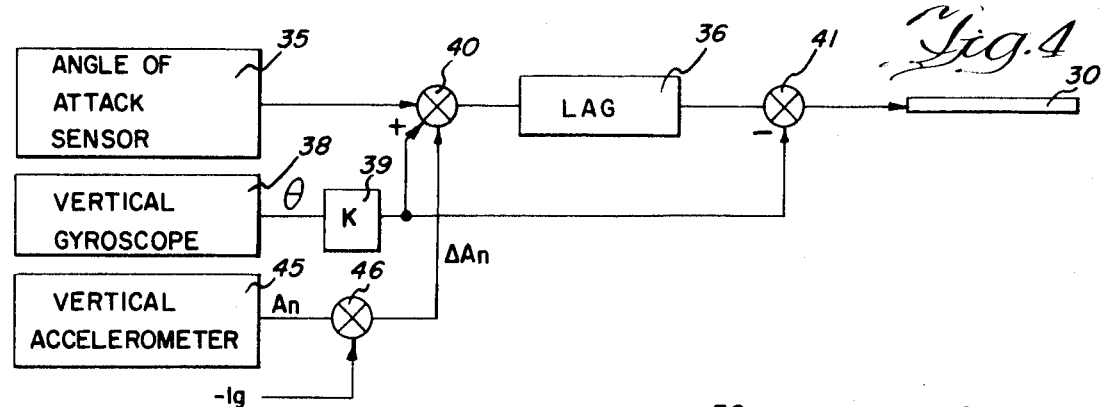
FIG. 4 is a functional block diagram of another embodiment of the aircraft instrument of the invention.

In some aircraft it may not be convenient to obtain an elevator position signal. FIG. 4 illustrates a system in which the pitch stabilization signal is compared with a signal from a normal accelerometer to distinguish between pitch changes caused by air mass movements and those which result from a pilot commanded maneuver. As in the system of FIG. 3, the angle of attack signal $\alpha$ from sensor 35 is connected through lag network 36 with the bar 30 of the display. The pitch signal, $\theta$, from vertical gyroscope 38 is connected through scaling network 39 with summing junction 40. The pitch signal is also summed with the output of lag network 36 at junction 41. The output, $A_n$, of vertical accelerometer 45 is normalized by adding a $-1g$ signal at summing junction 46. The change of normal acceleration, $\Delta A_n$, is summed with the pitch signal at junction 40. When the change in pitch is due to an air mass movement, the pitch and normal acceleration signals are additive. However, when the change in pitch is due to pilot control, the signals subtract and cancel.

Figure 5:
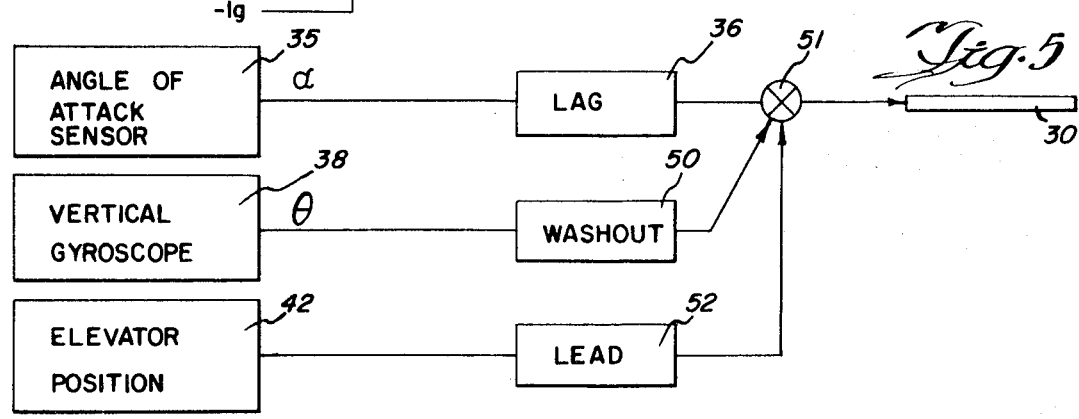
FIG. 5 is a block diagram of another instrument embodying the invention.

In the system of FIG. 3, the pitch and elevator signals are processed by the same lag circuit 36 as is the angle of attack signal. This system is preferable as it minimizes the filter circuits which are necessary in the system. However, in some instances it may not be practical to process all three signals with the same circuit, as where different time constants may be necessary. In such a situation, the system of FIG. 5 is used. Here, the angle of attack signal, $\alpha$, from sensor 35 is connected through lag circuit 36 with the bar 30 of the display. The pitch signal, $\theta$, from vertical gyroscope 38 is connected through a washout circuit 50 with summing junction 51, between lag circuit 36 and the display device. The washout circuit in effect passes the time varying component of the pitch signal while blocking the steady state component thereof. The occurrence of a pilot commanded maneuver is again detected by a change in elevator position. The elevator angle signal, $\delta$, is connected from sensor 42 through a lead filter 52 with summing junction 51. Thus, a signal representing change in pitch due to air mass movement is added to the angle of attack signal displayed by bar 30 providing the desired pitch stabilization of the instrument.

An angle of attack signal derived directly from an angle of attack sensor, as a pivoted vane mounted in the air strip, may have so much noise that it is not practical to filter it to obtain a usable signal for display. An angle of attack signal, based on inertial sensors, may be derived as described in the Bateman et al. application identified above. It is to be understood that the present invention is not limited with regard to the manner in which the flight path signal is obtained. Furthermore, other modifying signals, as the roll compensation and the wind compensation of the Bateman et al. application, may be added without detracting from the utility of this invention.

I claim:

1. In an aircraft instrument having a head-up screen for displaying indicia the position of which represents an aircraft flight path condition with respect to the outside world, signal generating means, comprising:

a source of signal representing the aircraft flight path condition;

means responsive to the pitch attitude of the aircraft;

means connected with the pitch responsive means for generating a signal representing the change in pitch attitude of the aircraft;

means responsive to said pitch change signal for distinguishing between changes in pitch attitude attributed to a wind gust and to a pilot commanded maneuver, for generating a signal representing a change in aircraft attitude attributable to a wind gust;

means for combining said flight path condition and gust attributed aircraft attitude change signals; and means for utilizing said combined signals in positioning the indicia of said display.

2. The aircraft instrument of claim 1 including means for deriving a signal from the aircraft elevator position, indicating the occurrence of a pilot commanded maneuver, and means for combining the elevator position signal with the pitch change signal to identify a change in aircraft attitude attributed to a gust.

3. The aircraft instrument of claim 1 including means for deriving a signal from a vertical accelerometer, indicating the occurrence of a pilot commanded maneuver, and means for combining the vertical accelerometer signal with the pitch change signal to identify a change in aircraft attitude attributed to a gust.

4. In an aircraft instrument having a head-up screen for displaying indicia the position of which represents an aircraft flight path condition with respect to the outside world, signal generating means, comprising:

a source of signal representing the aircraft flight path condition;

a vertical gyroscope responsive to the pitch attitude of the aircraft;

means for deriving from said vertical gyroscope a signal representing the pitch attitude of the aircraft;

means for processing said pitch signal to derive therefrom a pitch change signal representing a change in aircraft attitude attributable to a wind gust;

means for combining said flight path condition and gust attributed aircraft attitude change signals; and means for utilizing said combined signals in positioning the indicia of said display.

5. The aircraft instrument of claim 4 in which said processing means includes means for establishing the steady state value of the pitch signal and means for subtracting the steady state signal from the pitch signal to derive the pitch change signal.

6. The aircraft instrument of claim 4 in which said processing means includes a filter for passing only the time varying component of said pitch signal.

7. In an aircraft instrument having a head-up screen for displaying indicia the position of which represents an aircraft flight path condition with respect to the outside world, signal generating means, comprising:

a source of signal representing the aircraft flight path condition;

a lag circuit connected with said source of aircraft flight path condition signal;

a source of signal representing the pitch attitude of the aircraft;

a source of signal representing the position of the elevator of the aircraft;

means for summing said pitch and elevator position signals in one sense with said flight path condition signal, ahead of said lag circuit;

means for summing said pitch and elevator position signals in the opposite sense with the signal at the output of said lag circuit, to provide combined signals representing the aircraft flight condition compensated for changes in aircraft attitude attributable to a wind gust; and means for utilizing said combined signals in positioning the indicia of said display.

8. In an aircraft instrument having a head-up screen for displaying indicia the position of which represents an aircraft flight path condition with respect to the outside world, signal generating means, comprising:

a source of signal representing the aircraft flight path condition;

a lag circuit connected with said source of aircraft flight path condition signal;

a source of signal representing pitch attitude of the aircraft;

a source of signal representing vertical acceleration of the aircraft;

means for summing the pitch and vertical acceleration signals with the aircraft flight path condition signal ahead of said lag circuit;

means for summing the aircraft pitch attitude signal in the opposite sense with the signal at the output of said lag circuit, to provide combined signals representing the aircraft flight condition compensated for changes in aircraft attitude attributable to a wind gust; and means for utilizing said combined signals in positioning the indicia of said display.

9. In an aircraft instrument having a head-up screen for displaying indicia the position of which represents an aircraft flight path condition with respect to the outside world, signal generating means, comprising:

a source of signal representing the aircraft flight path condition;

a lag circuit connected with said source of flight path condition signal;

a source of signal representing the pitch attitude of the aircraft;

a source of signal representing the position of the elevator of said aircraft;

means for deriving from said pitch signal a pitch change signal;

means for deriving from said elevator position signal an elevator movement signal;

means for summing the pitch change and elevator movement signals with the signal at the output of said lag circuit, to provide combined signals representing the aircraft flight condition compensated for changes in aircraft attitude attributable to a wind gust; and means for utilizing said combined signals in positioning the indicia of said display.

* * * * *